US009459911B2

(12) United States Patent
Liu et al.

(10) Patent No.: US 9,459,911 B2
(45) Date of Patent: *Oct. 4, 2016

(54) DYNAMICALLY ADJUSTING A LOG LEVEL OF A TRANSACTION

(71) Applicant: INTERNATIONAL BUSINESS MACHINES CORPORATION, Armonk, NY (US)

(72) Inventors: Jeffrey Ch Liu, Taipei (TW); Chih-Wen Su, Taipei (TW); Ivan Nestlerode, Cambridge, MA (US); Johnson Ys Chang, Taipei (TW); Giant HM Tu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 13/927,592

(22) Filed: Jun. 26, 2013

(65) Prior Publication Data

US 2014/0007119 A1 Jan. 2, 2014

(30) Foreign Application Priority Data

Jun. 29, 2012 (TW) .............................. 101123680 A

(51) Int. Cl.
*G06F 9/46* (2006.01)
*G06F 9/54* (2006.01)
*G06F 11/14* (2006.01)

(52) U.S. Cl.
CPC ................. *G06F 9/466* (2013.01); *G06F 9/54* (2013.01); *G06F 11/1471* (2013.01)

(58) Field of Classification Search
None
See application file for complete search history.

(56) References Cited

U.S. PATENT DOCUMENTS

| 8,099,726 | B2 | 1/2012 | Harris |
| 8,156,387 | B2 | 4/2012 | Njo et al. |
| 2004/0068501 | A1 | 4/2004 | McGoveran |
| 2004/0122942 | A1* | 6/2004 | Green et al. .................. 709/224 |
| 2005/0223366 | A1 | 10/2005 | Smith et al. |
| 2006/0193397 | A1 | 8/2006 | Kirisawa et al. |
| 2006/0195731 | A1 | 8/2006 | Patterson et al. |
| 2008/0126828 | A1 | 5/2008 | Girouard et al. |
| 2010/0058291 | A1 | 3/2010 | Hahn et al. |
| 2011/0066891 | A1 | 3/2011 | Wechsler et al. |

FOREIGN PATENT DOCUMENTS

| JP | 2011-113354 A | 11/2009 |
| WO | WO 00/47003 | * 1/1999 |

OTHER PUBLICATIONS

Sushil Patil, A Method to Validate the Integrity of Individual Transactions and Related Interdependent Transactions with Possible Error Recovery, Semantec Corporation, Jan. 30, 2012, US.
"A Method and Apparatus for Asynchronously Log Processing in Application Servers," IP.com Disclosure No. IPCOM000210664D, Sep. 8, 2011.
Wissam, Rashid, Non-Final Office Action, U.S. Appl. No. 14/473,356, The United States Patent and Trademark Office, pp. 1-13, Mar. 3, 2016 (Relevant pp. 1-13).

* cited by examiner

*Primary Examiner* — Wissam Rashid
(74) *Attorney, Agent, or Firm* — Eustace P. Isidore; Yudell Isidore PLLC

(57) ABSTRACT

A computer system and program product dynamically adjusts a log level of a transaction by: buffering the most detailed logs of a transaction having highest log level into a memory; checking if all dependency-defined transactions within a dependency list/tree for the transaction are completed; and, in response to the completion of all dependency-defined transactions within the dependency list/tree for the transaction, obtaining a log filter level for the transaction in association with the transaction results (success/failure) of dependency-defined transactions, wherein the log filter level is a new log level for the transaction.

20 Claims, 8 Drawing Sheets

DYNAMICALLY ADJUSTING A LOG LEVEL OF A TRANSACTION

PRIORITY

The present application claims benefit of priority under 35 USC §120 and §365 to the previously filed Taiwan Patent Application No. 101123680, titled, "Dynamically Adjusting a Log Level of a Transaction" with a priority date of Jun. 29, 2012. The content of that application is incorporated by reference herein.

BACKGROUND OF THE DISCLOSURE

1. Field of the Disclosure

The present disclosure relates to technology pertaining to log levels of transactions, and more particularly, to a method, computer system, and program product for dynamically adjusting a log level of a transaction.

2. Description of the Prior Art

In a data processing system, a transaction is a related task composed of units known as "success" and "failure". For example, a transaction processing system (TPS) is typically a data processing system for storing and recording day-to-day business information and conducting day-to-day business, and the TPS usually consists of events, business procedures, and business activities. Normally, a process of processing a transaction involves creating or updating data and thus requires logging to enable tracking or troubleshooting. A detailed log of every transaction (or every record in a database) in the system adds to the use of system resources (for example, processing power, and the use of storage space and memory.)

Logs are recorded at different levels, according to debugging needs. The recorded Logs thus vary from level to level. For example, five consecutive log levels are configured, namely DEBUG, INFO, WARN, ERROR and FATAL, wherein DEBUG is the highest log level, whereas FATAL is the lowest log level. The higher the log level is, the more detailed the log is recorded. Of course, level can vary from system to system. For example, frameworks are recorded in Java at different severity levels (Visit http://en.wikipedia.org/wiki/Java_logging_framework).

The log level being set to DEBUG level is effective in investigating the underlying cause (root cause) of failure of a transaction. However, as described above, logs at DEBUG level have a disadvantage, which is that the DEBUG level logs need plenty of storage space for storing detailed data. In fact, most detailed data are likely to be unrelated to an issue under investigation, and logs at DEBUG level are likely to contain plenty of undesirable noise. The aforesaid drawback is especially obvious because, considering that a device for processing a transaction event is often provided with limited storage space for storing logs and the logs of successful transactions, the logs occupy most of the log space. To debug an issue with the data contained in a log, a system administrator has to spend much time digging into plenty of DEBUG level logs and identifying any logs related to an intended issue. Moreover, assuming that the space for storing logs is inadequate, the device is likely to delete old logs in order to reclaim space for use by a new log. In such a situation, some old but interesting logs are likely to be overwritten by new but useless logs.

Furthermore, when it comes to a system that processes a large amount of transactions concurrently, the big challenge is to identify the root cause of failure of a transaction just by investigating a created log. It is very likely that the failure of a transaction is a collateral result of any other preceding successful transaction. That is to say, the "dependency" between transactions remains unidentified.

There are two conventional solutions of the aforesaid problem. One of the solutions involves lowering the log level and thereby reducing the amount of logs, as disclosed in U.S. Pat. No. 8,156,387 entitled "Method and System for Error Manipulation," for example. The other solution involves digging into plenty of logs to identify the intended ones, as disclosed in US Pub. 2006/0195731 and US Pub. 2008/0126828, for example. However, the present disclosure recognizes that no prior art discloses correlating concurrent transactions with each other according to the dependency between the transactions. Accordingly, the present disclosure realizes that it is imperative to identify the root cause of failure of a transaction efficiently by means of log data related to an aborted transaction.

SUMMARY OF THE DISCLOSURE

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

The present disclosure provides a new logging mechanism. During the period of time in which a transaction is being processed, the mechanism keeps the most detailed log information in a buffering memory until the transaction is completed and no other transactions are affected by the transaction, so as to (i) adjust the log level of the transaction dynamically according to the transaction results of the current transaction and dependency-defined transactions and (ii) store the necessary log in a hard disk drive or any permanent storage according to the determined log level. For example, if a transaction is successfully completed and there is no correlation between the transaction and any other transactions, the log of the transaction will be filtered by a "success" log filter level (i.e., a success log level). On the other hand, in case of failure of a transaction or failure of any other transaction correlated to the transaction, the log of the transaction will be filtered by a "failure" log filter level (i.e., a failure log level).

To identify those transactions which are related to the current transaction, a transaction dependency for a transaction in terms of a specific dependency factor is created with a list. A specific dependency factor is an attribute, resource or feature shared by two transactions. For example, two transactions may apply to identical destinations, be served by identical threads, originate from identical transmission control protocol (TCP) ports, or access identical virtual memory addresses. In a case when only a specific dependency factor exists between a transaction and another transaction, a "dependency list" that enumerates the transaction dependency of the transaction is created according to the time of arrival of the transaction. When a transaction and any other transactions may share a plurality of dependency factors, a "dependency tree" that enumerates the transaction dependency of a transaction is created. An embodiment of the present disclosure discloses a mechanism whereby an aborted transaction can be tracked back to a preceding transaction, so as to acquire detailed log information for use in identifying the underlying cause of transaction failure efficiently.

According to an embodiment of the present disclosure, the present disclosure provides a computer program product having executable program code for dynamically adjusting a log level of a transaction. The program code comprises code for: buffering a log of a transaction at a highest log level into a memory when the transaction is completed; determining whether all dependency-defined transactions within a dependency list/tree for the transaction are completed; and calculating a log filter level for the transaction, in association with transaction results (one of failure and success) of dependency-defined transactions, in response to completion of all the dependency-defined transactions, wherein the log filter level is a new log level for the transaction.

According to another embodiment of the present disclosure, the present disclosure provides a computer system for use with code conversion in a small target coding space. The computer system comprises: a host, comprising a bus system, a memory connected to the bus system, where the memory comprises an instruction, and a processing unit connected to the bus system, where the processing unit executes the instruction to thereby execute the aforesaid method of code conversion.

According to another embodiment of the present disclosure, the present disclosure provides a computer system for use with code conversion in a small target coding space, and a computer program product stored in a computer-readable device and having a computer-readable program executable by a computer to implement the aforesaid method of code conversion.

The following description, the appended claims, and the embodiments of the present disclosure further illustrate the features and advantages of the present disclosure.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings.

DETAILED DESCRIPTION OF THE EMBODIMENTS

Figure 1:
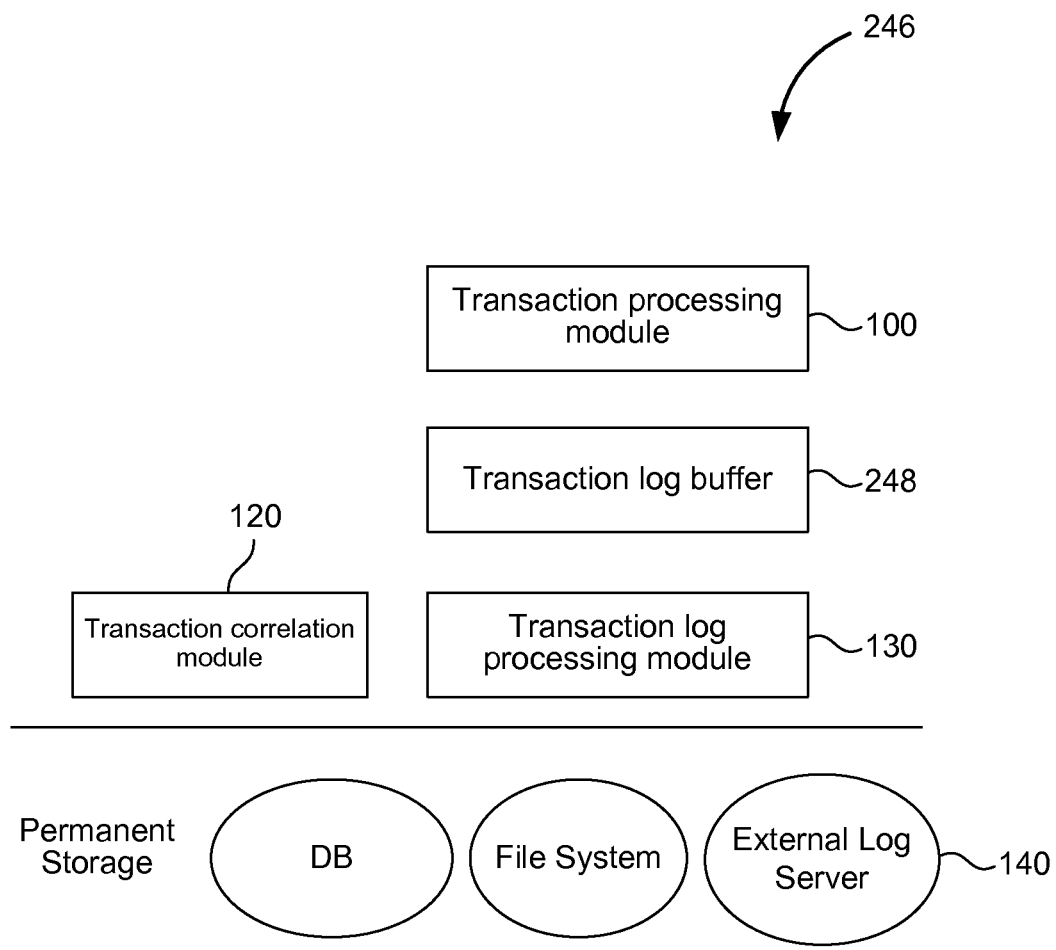
FIG. 1 is a schematic view of a system component framework according to a specific embodiment of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As will be appreciated by one skilled in the art, the present disclosure may be embodied as a computer device or a computer program product. Accordingly, the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, the present disclosure may take the form of a computer program product embodied on any tangible storage device having computer-usable program code embodied on the storage device.

Any combination of one or more computer usable or computer readable medium(s) and/or device(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable device that can direct a computer or other programmable data processing apparatus to function in a particular manner, such that the instructions stored in the computer-readable device produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 5, computer devices, methods, and computer program products are illustrated as structural or functional block diagrams or process flowcharts according to various embodiments of the present disclosure. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a schematic view of a system component framework according to a specific embodiment of the present disclosure. A log level dynamic adjustment module 246 comprises a transaction processing module 100, a transaction log buffer 248, a transaction correlation module 120, and a transaction log processing module 130. To process a transaction, the transaction processing module 100 sends the most detailed log information (i.e., a log at a DEBUG level) to the transaction log buffer 248. The buffer 248 is a temporary storage for the most detailed log of each transaction. The buffer 248 keeps the log in the memory of the buffer 248 memory until the transaction log processing module 130 retrieves a specific portion of the log from the buffer. Upon completion of the retrieval, the temporarily stored log of the buffer 248 is erased and the buffer 248 is released for the system.

The transaction correlation module 120 keeps a transaction dependency according to the setting of dependency factors. The transaction correlation module 120 keeps the status of each transaction. Each transaction has three statuses, namely "transaction in process 300" status, "transaction completed 310" status, and "transaction log flush completed 330" status. Once a transaction reaches transaction log flush completed 330 status, the transaction log processing module 130 will retrieve from the buffer 248 the logs of the transaction and all dependency-defined transactions that are tracked by dependency-defined transactions completed status 320, calculate a transaction log filter level, and eventually create and send the final filtered log to a permanent storage 140, thereby flushing filtered logs to the permanent storage 140. The storage is a database, a file system, or even an external log server (such as a syslog-ng log server).

The transaction processing module 100, the transaction log buffer 248, the transaction correlation module 120, and the transaction log processing module 130 are described in detail below and illustrated with FIG. 3 through FIG. 6.

Computer System

Figure 2:
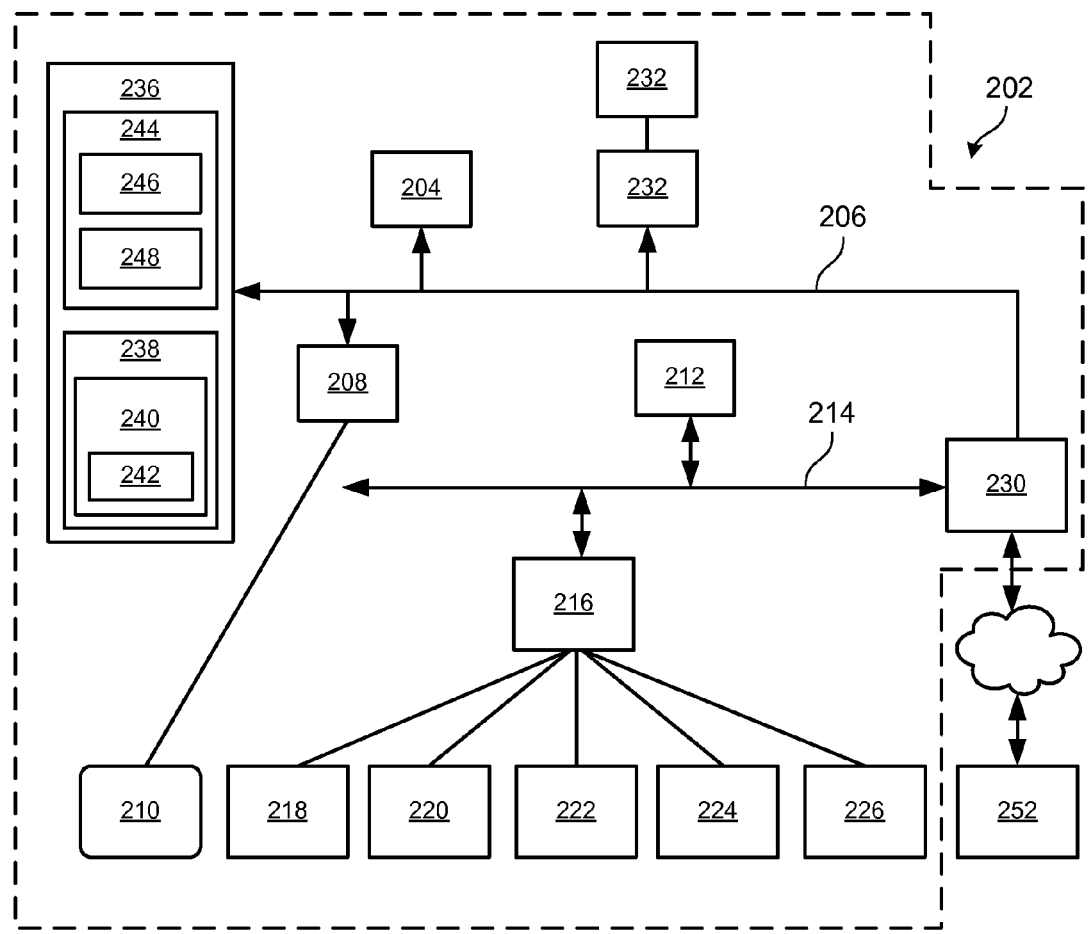
FIG. 2 is a block diagram of an exemplary hardware environment of a computer system according to the present disclosure.

FIG. 2 is a block diagram of an illustrative hardware environment of a computer device 202 according to the present disclosure. In an exemplary embodiment, a server is a universal desktop computer comprising: a processor for executing various applications; a storage device for storing various information and program code; a display device, a communication device, and an input/output device which function as interfaces for communicating with a user; and a peripheral component or other components serving a specific purpose. In another embodiment, the present disclosure is implemented in another way and thus having less or more other devices or components.

As shown in FIG. 2, a computer device 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

The computer device 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, the computer device 202 is able to access service provider server 252. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection. Instead, the network connection can also be implemented by wireless connection in the form of a GSM connection or a Wi-Fi connection for communicating with a client computer. The network further comprises other hardware and software components (not shown), such as an additional computer system, router, and firewall.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the computer device operating system (OS) 238 and application programs 244.

OS 238 includes a shell 240 for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present disclosure will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of a server 252 can be identical or similar to that of the computer device 202, or can be any conventional basic framework, and the present disclosure is not limited thereto. For example, the server 252 can be a desktop computer, a notebook computer, a personal digital assistant (PDA), or a smartphone. However, FIG. 2 and the above examples are not restrictive of the present disclosure. The server 252 comprises a browser. The browser comprises a program module and instructions. The program module and commands comply with the Hypertext Transfer Protocol (HTTP) whereby a World Wide Web (WWW) client (i.e., the computer device 202) sends and receives web-based messages through the Internet.

The application program 244 comprises the log level dynamic adjustment module 246 and the transaction log buffer 248 of the present disclosure. The log level dynamic adjustment module 246 comprises program modules and instructions. The program modules and instructions adjust a log level "dynamically" and store a log in a hard disk drive or another permanent storage according to the determined log level. The log level dynamic adjustment module 246 is a module in an application program or comes in the form of a daemon. However, in another embodiment, the log level dynamic adjustment module 246 is implemented by a program of any other type.

The hardware elements depicted in the computer device 202 are not intended to be exhaustive, but rather are representative to highlight essential components required by the present disclosure. For instance, computer device 202 may include alternate memory storage devices such as magnetic cassettes, Digital Versatile Disks (DVDs), Bernoulli cartridges, and the like. These and other variations are intended to be within the spirit and scope of the present disclosure.

Process Flow of Dynamically Adjusting a Log Level

Figure 3:
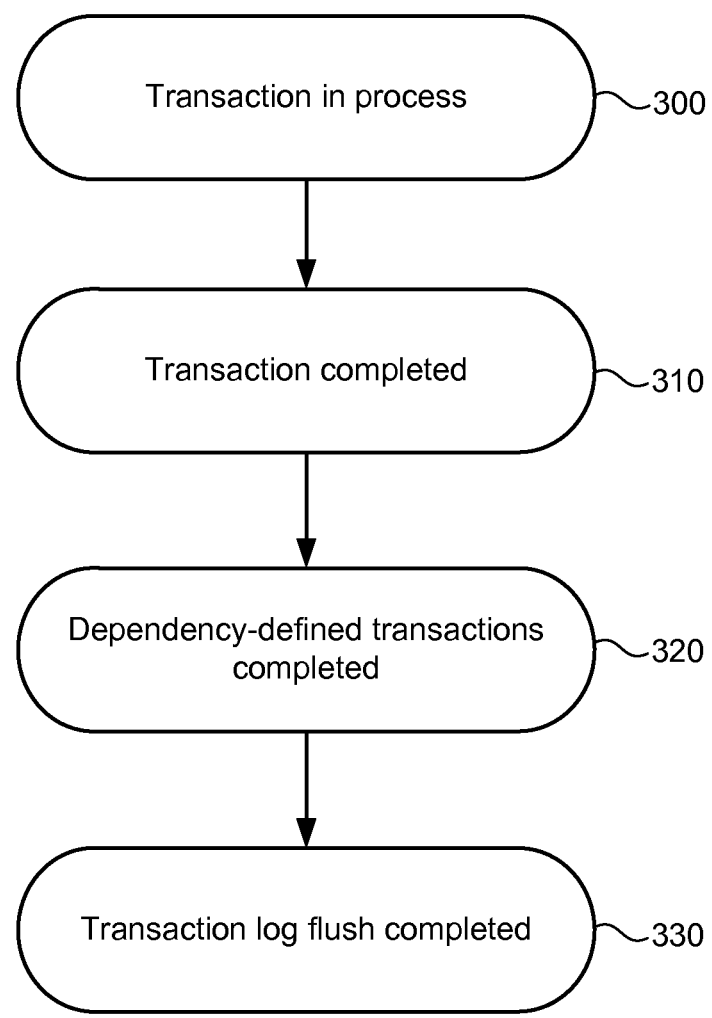
FIG. 3 is a schematic view of the transition of a status of each transaction according to an embodiment of the present disclosure.

Referring to FIG. 3, there is shown a schematic view of the transition of a status of each transaction according to an embodiment of the present disclosure.

Figure 4:
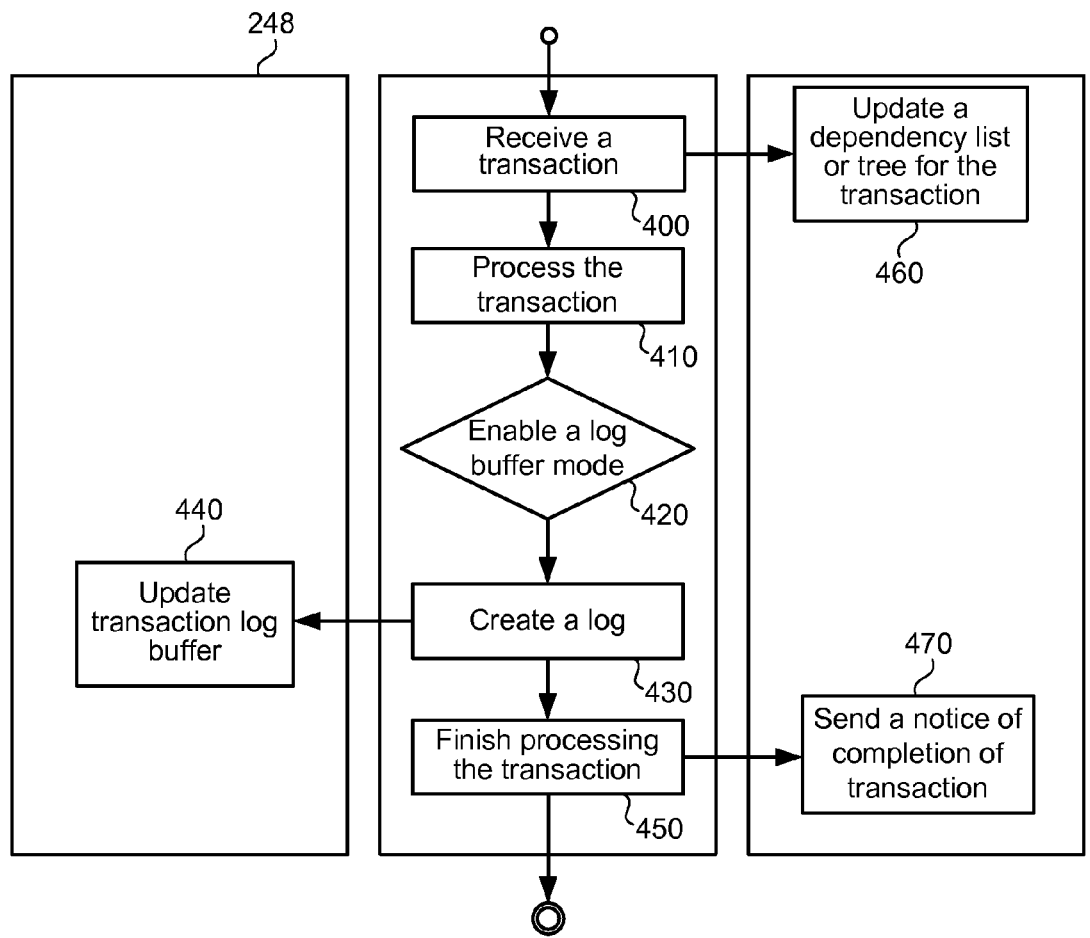
FIG. 4 is a flow chart of the transition of "transaction in process" status to "transaction completed" status according to a specific embodiment of the present disclosure.
Figure 5:
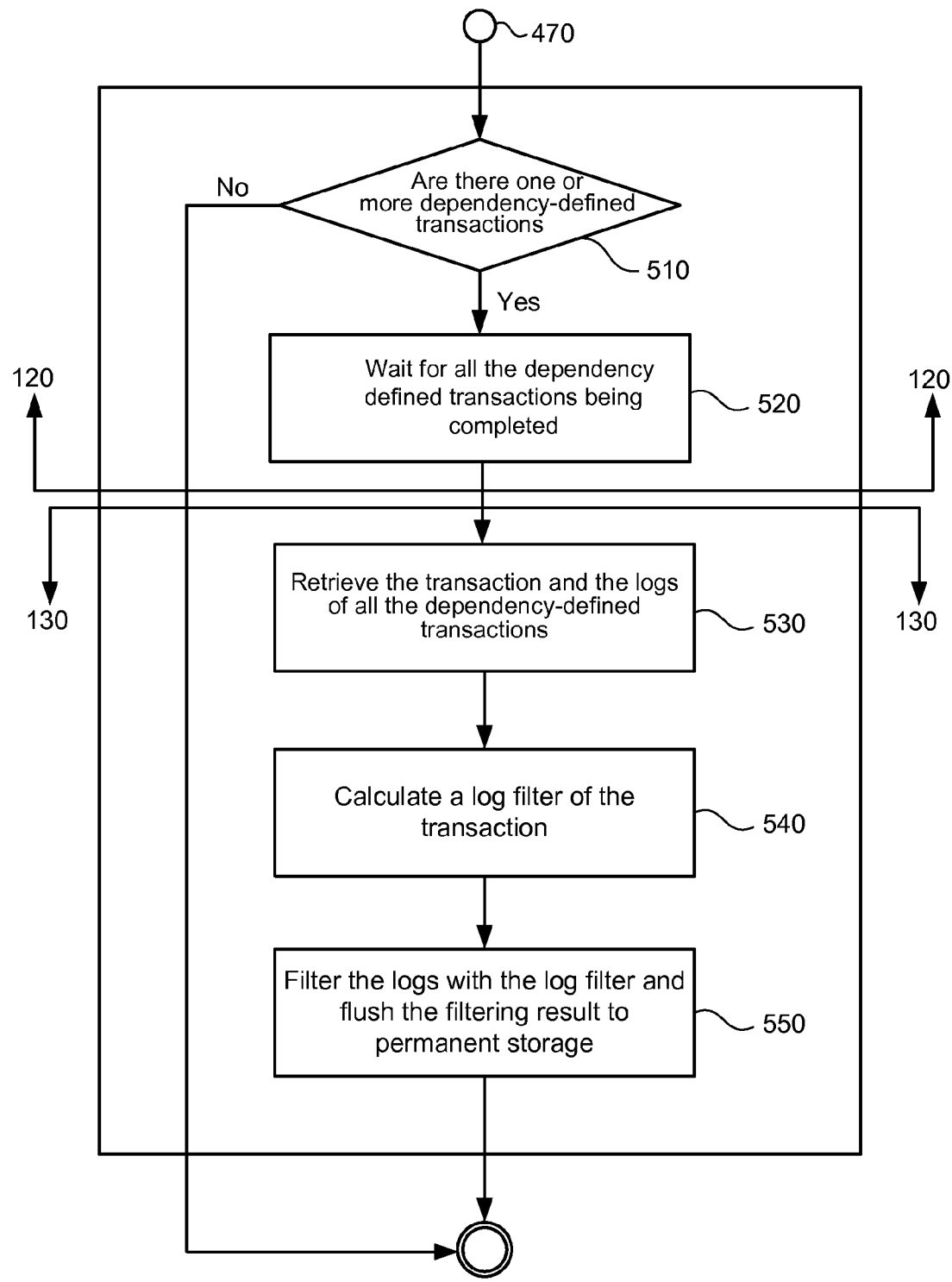
FIG. 5 is a flow chart of the transition of "transaction completed" status to "transaction log flush completed" status, according to a specific embodiment of the present disclosure.

As described above, each transaction has three statuses, namely "transaction in process 300" status, "transaction completed 310" status, and "transaction log flush completed 330" status. Additionally, the transactions can also include dependency-defined transactions completed status 320 which tracks other transactions that affect the current transaction. FIG. 3 through FIG. 5 illustrate the process flow of a method for use with the log level dynamic adjustment module according to a specific embodiment of the present disclosure. FIG. 4 is a flow chart of the transition of "transaction in process 300" status to "transaction completed 310" status. Referring to FIG. 4, the process flow of the aforesaid transition includes transaction processing module 100: receiving a transaction (block 400); processing the transaction (block 410); enabling a log buffer mode (block 420); creating a log (block 430); and updating a transaction log buffer 248 (step 440). A log message about a transaction is not written to the permanent storage 140 right away. In an embodiment of the present disclosure, the transaction processing module 100 sends the log message to a buffer (i.e., the transaction log buffer 248).

Then, the transaction processing module 100 finishes processing the transaction and enter "transaction completed 310" status (block 450). The transaction could either fail or succeed. Once a transaction enters "transaction completed 310" status, the transaction will release all resources other than the log buffer to the system. The buffer will still be reserved. All logs (including logs at the highest level) will be kept in the buffer 248.

Following, the transaction correlation module 120: updates a dependency list or tree for the transaction (block 460). Related details are described below and illustrated with FIG. 6. Then, the transaction processing module 100 sends a notice to the transaction correlation module 120 to notify the transaction correlation module 120 of the completion of the transaction, after finishing processing the transaction and activating "transaction completed 310" status (block 470).

Referring to FIG. 5, there is shown a flow chart of the transition of "transaction completed 310" status to "transaction log flush completed 330" status. At step 510, the transaction correlation module 120 checks whether there is a dependency-defined transaction, after receiving a notice of a transaction having entered "transaction completed 310" status. If there are one or more dependency-defined transactions, the transaction correlation module 120 checks dependency-defined transactions completion status 320 and the waits for all dependency-defined transactions to be completed (step 520). The completion can be determined by checking transaction statuses of all dependency-defined transactions to determine whether all the dependency-defined transactions are completed. In response to an affirmative determination, the transaction enters "dependency-defined transactions completed 320" status. According to an embodiment of the present disclosure, the completion can be determined by receiving a "notice of completion" of each dependency-defined transaction.

In response to the transaction's entering "dependency-defined transactions completed 320" status, the transaction log processing module 130 retrieves from the buffer 248 the logs of the transaction and all the dependency-defined transactions (step 530). In one embodiment, step 530 can also follow step 540.

The transaction log processing module 130 calculates and obtains a log filter level of the transaction in association with transaction completion results (that is, failure or success) of the dependency-defined transactions (step 540). The log filter is a new log level for the transaction. In case of failure of the transaction or of any dependency-defined transactions, the log levels of all related transactions will be changed to the most detailed log level (e.g., DEBUG). If there is no transaction failure, a new log filter level of the transaction (i.e., the current transaction) could be determined with the following equation:

new log filter level=Max(the log filter level of the
current transaction, Max(log filter level of
dependency-defined transactions))

That is to say, the highest log filter level among the log filter level of the current transaction and the log filter levels of dependency-defined transactions serves as a new log filter level for the current transaction.

The present disclosure is not limited to the above-mentioned equation or associated rules, and thus it is also feasible to use other calculation rules in alternate embodiments. For example, in case of the absence of transaction failure, the new log level of the current transaction is determined by giving sole consideration to a comparison of the log level of a transaction having direct dependency with the transaction and the log level of the current transaction. Furthermore, the new log level of each transaction is calculated, preferably starting from the end of a dependency list or tree.

Following, at step 550, the transaction log processing module 130 creates a final necessary filtered log, according to the new log filter level of the transaction and writes the final filtered log to the permanent storage 140, thereby flushing a filtered log to the permanent storage 140. As a result, the transaction enters "transaction log flush completed 330" status, and the log buffer is released.

Figure 6:
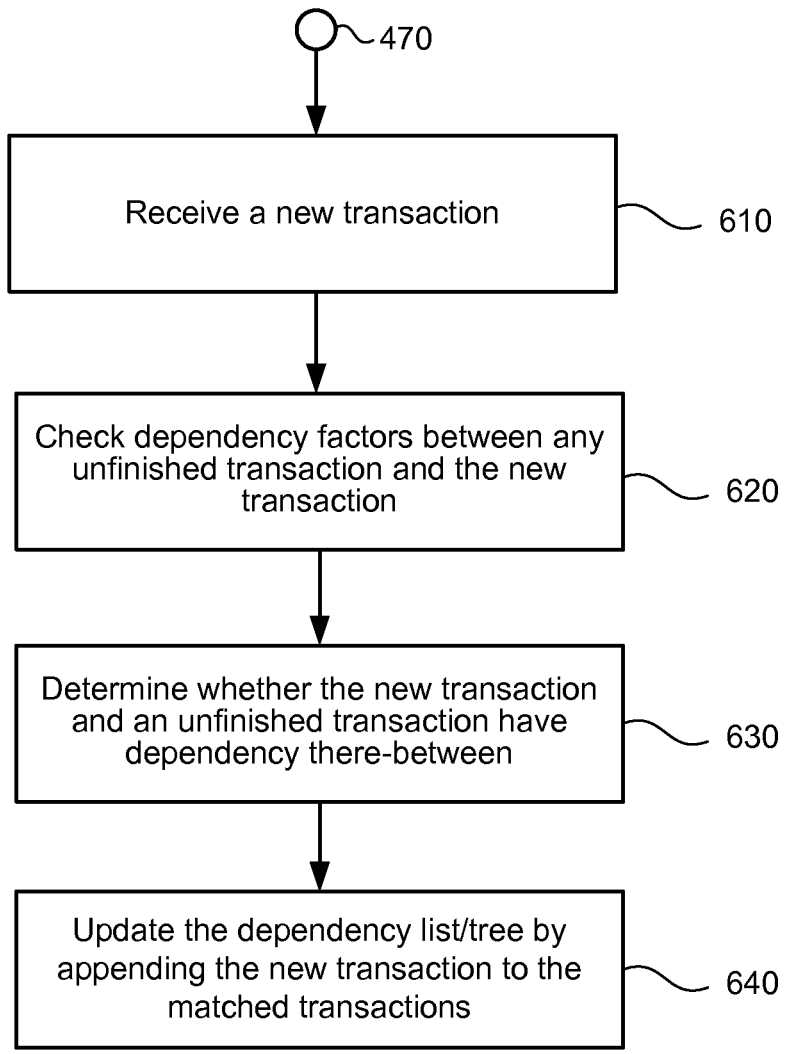
FIG. 6 is a flow chart of a transaction correlation module according to a specific embodiment of the present disclosure.

Referring to FIG. 6, there is shown a flow chart of a transaction correlation module 120 according to a specific embodiment of the present disclosure. As shown in the diagram, dependency-defined transactions within a dependency list or tree for the transaction are updated. At step 610, the transaction correlation module 120 receives a new transaction. The transaction correlation module 120 checks dependency factors between all unfinished transactions and the new transaction (step 620). With respect to the aforesaid dependency factors, a specific dependency factor is an attribute, resource or feature shared by two transactions. For example, two transactions may apply to identical destinations, be served by identical threads, originate from identical TCP ports, or access identical virtual memory addresses. In a case when only a specific dependency factor exists between a transaction and another transaction, a "dependency list" that enumerates the transaction dependency of the transaction is created according to the time of arrival of the transaction. When a transaction and any other transactions may share a plurality of dependency factors, a "dependency tree" that enumerates the transaction dependency of a transaction is created.

Furthermore, the checking by the transaction correlation module 120 can calculate a dependency score according to specific dependency factors between a new transaction and unfinished transactions. In a case where two transactions apply to identical destinations, the two transactions may feature a high degree of dependency there-between, and the dependency score will be higher. Specified dependency scores can vary from dependency factor to dependency factor. When multiple dependency factors are shared, a total dependency score could be calculated.

At step 630, the transaction correlation module 120 determines whether the new transaction and an unfinished transaction have dependency there-between. That is, the transaction correlation module 120 determines whether the new transaction matches unfinished transactions in terms of dependency factors. For example, step 630 determines whether the new transaction matches unfinished transactions in terms of dependency factors. Thus the transactions have dependency, according to whether the total dependency score is higher than a predetermined threshold. In fact, the chance that a transaction and another transaction have dependency there-between depends on whether the transaction is earlier than the other transaction and whether the transaction and the other transaction share identical dependency factors.

Figure 8:
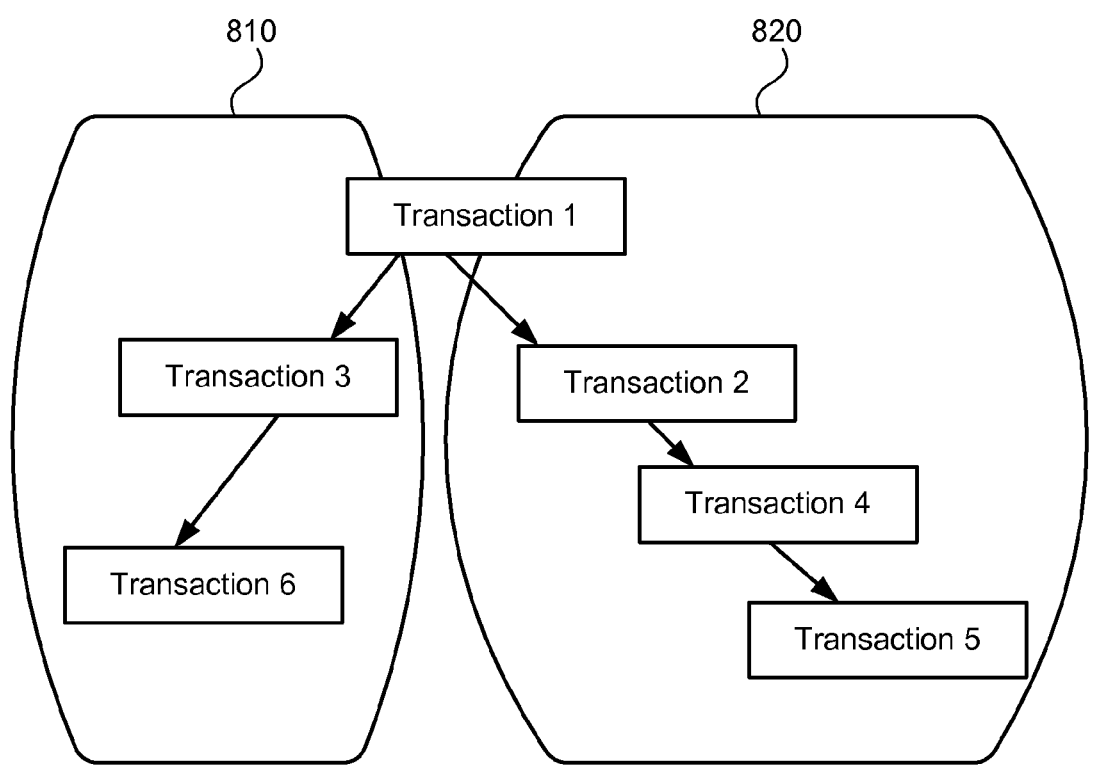
FIG. 8 is a schematic view of dependency branches created when considerations are given to two dependency factors according to a specific embodiment of the present disclosure.

At step 640, the transaction correlation module 120 updates the dependency list/tree by appending the new transaction to the matched transactions. In general, if consideration is given to a dependency factor only, the dependency can be expressed by a list. If consideration is given to more than one dependency factor, the dependency is expressed by a tree, as shown in FIG. 8. Branches 810, 820 are dependency branches based on considerations given to two dependency factors, for example, whether transactions share a TCP port and are served by the same thread. In addition, considering the system resource (such as the space of buffer) is limited, it is possible to dynamically adjust the length (i.e., the dependency level) of the list or the tree. If the system loading is low, the length of the list or the tree can increase. In FIG. 8, where there are three dependency levels, consideration is given to the 3rd level, i.e., the transaction 5.

Figure 7:
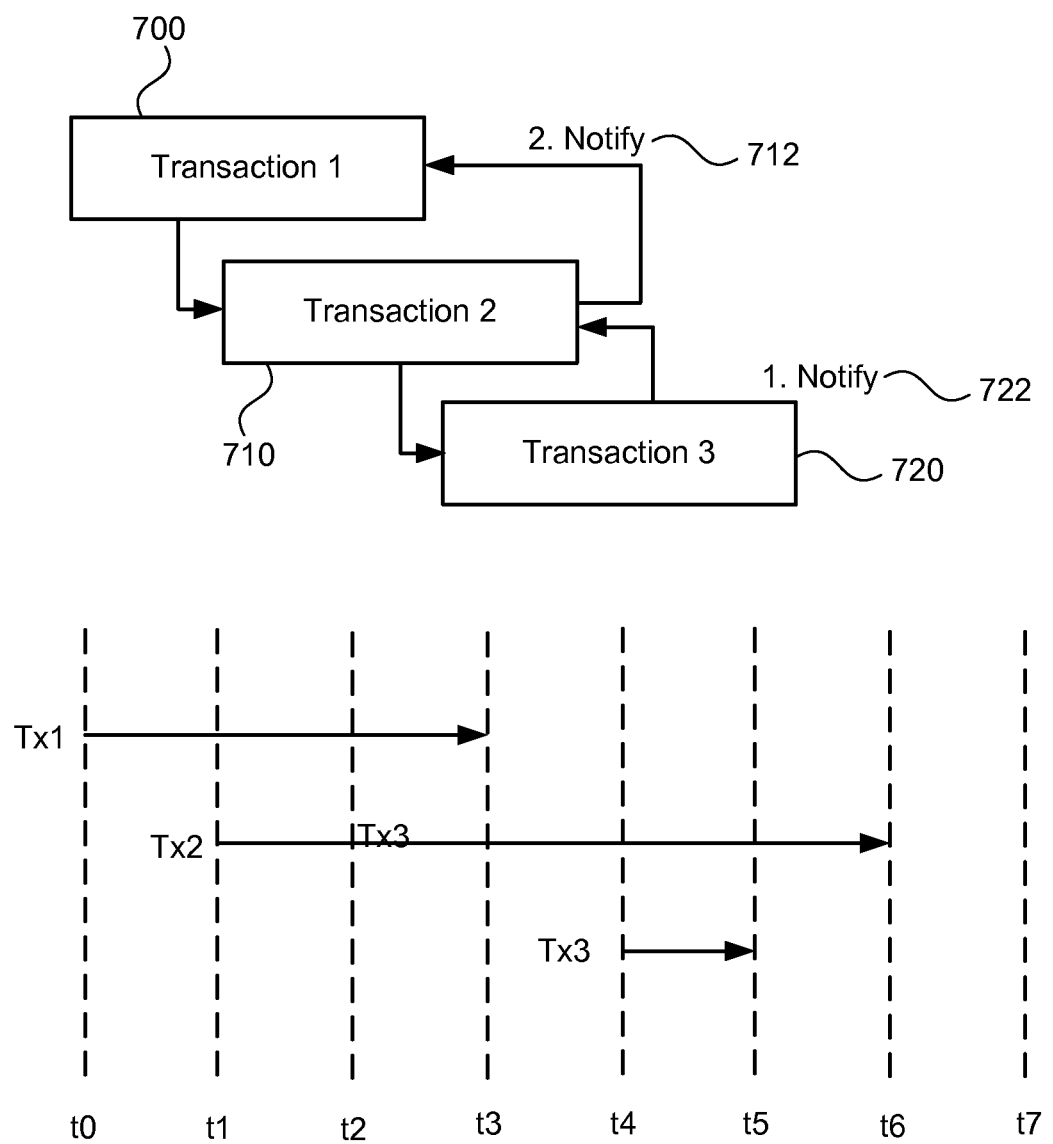
FIG. 7 shows examples of transaction dependency created by the transaction correlation module according to a specific embodiment of the present disclosure.

Referring to FIG. 7, there is shown examples of transaction dependency created by the transaction correlation module 120 according to a specific embodiment of the present disclosure. As shown in the diagram, transaction 1 700 starts at time t0, whereas transaction 2 710 starts at time t1. It is determined that there is dependency between transaction 1

700 and transaction 2 710, and that transaction 1 700 dependency-defines transactions 2 710. Transaction 1 700 is completed at time t3, and then transaction 1 700 has to wait for the completion of transaction 2 710. Transaction 3 720 starts at time t4. Hence, it is determined that there is dependency between transaction 2 710 and transaction 3 720, and that transaction 2 710 dependency-defines transaction 3 720. Transaction 3 720 is completed at time t5; meanwhile, translation 3 720 notifies (at 722) transaction 2 that it is completed and is going to flush a log of its buffer. Transaction 2 710 is completed at time t6; meanwhile, transaction 2 710 notifies transaction 1 700 that it is completed and is going to flush a log of its buffer. The log of the buffer of transaction 1 700 is also flushed, because dependency-defined transactions collect all the notices.

The foregoing preferred embodiments are provided to illustrate and disclose the technical features of the present disclosure, and are not intended to be restrictive of the scope of the present disclosure. Hence, all equivalent variations or modifications made to the foregoing embodiments without departing from the spirit embodied in the disclosure of the present disclosure should fall within the scope of the present disclosure as set forth in the appended claims.

What is claimed is:

1. A computer program product stored in a non-transitory computer-readable storage device and comprising a computer-readable program executable by a computer to dynamically adjust a log level of a transaction, the computer-readable program including program code that configures a computer to:
    in response to receiving notice of a transaction being completed, buffer a log of the transaction at a highest log level into a memory;
    determine whether all dependency-defined transactions within a dependency list for the transaction have completed, wherein each dependency-defined transaction that has completed is associated with a log having a log filter level that identifies a success or failure of a corresponding dependency-defined transaction;
    in response to determining all of the dependency-defined transactions within the dependency list have completed:
        retrieve, from the memory, the log of the transaction and the log of each of the dependency-defined transactions; and
        calculate a log filter level for the transaction, in association with transaction results within the logs of the dependency-defined transactions; and
    in response to determining a failure of one of (i) the transaction and (ii) any dependency-defined transaction, change the log filter levels of the transaction and all of the dependency-defined transactions to a highest log filter level from among the log filter level of the transaction and the log filter levels of the dependency-defined transactions.

2. The computer program product of claim 1, wherein: the computer-readable program further comprises code that configures the computer to:
    in response to there being only one dependency factor between the transaction and another transaction, create a dependency list that enumerates the transaction dependency of the transaction, wherein the dependency list is created according to a time of arrival of the transaction with reference to a dependency factor shared by the transaction and another transaction from among the dependency-defined transactions, wherein the dependency factor is one of an attribute, a resource, and feature shared by the transaction and the other transaction, and wherein the dependency factor is one of a thread, a TCP port, and a virtual memory address; and
    dynamically adjust a length of the dependency list based on availability in the memory.

3. The computer program of claim 1, the computer-readable program further comprising code that configures the computer to: in response to an absence of a transaction failure from among the transaction and any dependency-defined transaction, establish a new log filter level of the transaction to a highest log filter level from among the current transaction and the log filter levels of the dependency-defined transactions.

4. The computer program product of claim 1, the computer-readable program further comprising code that configures the computer to: in response to an absence of a transaction failure from among the transaction and any dependency-defined transaction, determine a new log filter level of the transaction as a highest log filter level among the log filter level of the transaction and the log filter level of a dependency-defined transaction having direct dependency with the transaction.

5. The computer program product of claim 1, the computer-readable program further comprising code that configures the computer to:
    create a filtered log according to the new log filter level of the transaction; and
    write the filtered log to a permanent storage.

6. The computer program product of claim 1, the computer-readable program further comprises code that configures the computer to:
    in response to there being multiple dependency factors between the transaction and the dependency-defined transactions, create a dependency tree that enumerates the transaction dependency of the transaction, wherein a dependency factor is one of an attribute, a resource, and feature shared by the transaction and another transaction from among the dependency-defined transactions, wherein the dependency factor is one of a thread, a TCP port, and a virtual memory address, and wherein the dependency list is the dependency tree.

7. The computer program product of claim 1, wherein highest log filter level is a most detailed log level from among the log filter level of the transaction and the log filter levels of the dependency-defined transactions.

8. A computer program product stored in a non-transitory computer-readable storage device and comprising a computer-readable program executable by a computer to dynamically adjust a log level of a transaction, the computer-readable program including program code that configures the computer to:
    in response to receiving notice of a transaction being completed, buffer a log of the transaction at a highest log level into a memory;
    determine whether all dependency-defined transactions within a dependency list for the transaction have completed, wherein each dependency-defined transaction that has completed is associated with a log having a log filter level that identifies a success or failure of a corresponding dependency-defined transaction;
    in response to determining all of the dependency-defined transactions within the dependency list have completed:
        retrieve, from the memory, the log of the transaction and the log of each of the dependency-defined transactions; and calculate a log filter level for the transaction, in association with transaction results within the logs of the dependency-defined transactions; and in response to an absence of a transaction failure from among the transaction and any dependency-defined transaction, establish a new log filter level of the transaction to a highest log filter level from among the current transaction and the log filter levels of the dependency-defined transactions.

9. The computer program product of claim 8, wherein the new log filter level of the transaction is a highest log filter level from among the log filter level of the transaction and the log filter levels of the dependency-defined transactions.

10. The computer program product of claim 8, the computer-readable program further comprising code that configures the computer to:

create a filtered log according to the new log filter level of the transactions; and write the filtered log to a permanent storage.

11. The computer program product of claim 8, wherein the computer-readable program further comprises code that configures the computer to:

in response to there being only one dependency factor between the transaction and another transaction, create a dependency list that enumerates the transaction dependency of the transaction, wherein the dependency list is created according to a time of arrival of the transaction with reference to a dependency factor shared by the transaction and another transaction from among the dependency-defined transactions; and wherein the dependency factor is one of an attribute, a resource, and feature shared by the transaction and the other transaction, and wherein the dependency factor is one of a thread, a TCP port, and a virtual memory address; and dynamically adjust a length of the dependency list based on availability in the memory.

12. The computer program product of claim 8, the computer-readable program further comprises code that configures the computer to:

in response to there being multiple dependency factors between the transaction and the dependency-defined transactions, create a dependency tree that enumerates the transaction dependency of the transaction, wherein a dependency factor is one of an attribute, a resource, and feature shared by the transaction and another transaction from among the dependency-defined transactions, wherein the dependency factor is one of a thread, a TCP port, and a virtual memory address, and wherein the dependency list is the dependency tree.

13. The computer program product of claim 8, wherein highest log filter level is a most detailed log level from among the log filter level of the transaction and the log filter levels of the dependency-defined transactions.

14. A computer device for dynamically adjusting a log level of a transaction, the computer device comprising:

a bus system;

a memory connected to the bus system, wherein the memory comprises a plurality of instructions; and a processing unit connected to the bus system, wherein the processing unit executes the instructions to cause the computer device to:

in response to receiving notice of a transaction being completed, buffer a log of the transaction at a highest log level into a memory;

determine whether all dependency-defined transactions within a dependency list for the transaction have completed, wherein each dependency-defined transaction that has completed is associated with a log having a log filter level that identifies a success or failure of a corresponding dependency-defined transaction;

in response to determining all of the dependency-defined transactions within the dependency list have completed:

retrieve, from the memory, the log of the transaction and the log of each of the dependency-defined transactions; and calculate a log filter level for the transaction, in association with transaction results within the logs of the dependency-defined transactions; and in response to determining a failure of one of (i) the transaction and (ii) any dependency-defined transaction, change the log filter levels of the transaction and all of the dependency-defined transactions to a highest log filter level from among the log filter level of the transaction and the log filter levels of the dependency-defined transactions.

15. The computer device of claim 14, wherein the instructions further configure the computer device to, in response to an absence of a transaction failure from among the transaction and any dependency-defined transaction, establish a new log filter level of the transaction to a highest log filter level from among the current transaction and the log filter levels of the dependency-defined transactions.

16. The computer device of claim 14, wherein the instructions further configure the computer device to, in response to an absence of a transaction failure from among the transaction and any dependency-defined transaction, determine a new log filter level of the transaction as a highest log filter level among the log filter level of the transaction and the log filter level of a dependency-defined transaction having direct dependency with the transaction.

17. The computer device of claim 14, wherein the instructions further configures the computer device to:

create a filtered log according to a new log filter level of the transaction, and write the filtered log to a permanent storage.

18. The computer device of claim 14, the instructions further configure the device to:

in response to there being only one dependency factor between the transaction and another transaction, create a dependency list that enumerates the transaction dependency of the transaction, wherein the dependency list is created according to a time of arrival of the transaction with reference to a dependency factor shared by the transaction and another transaction from among the dependency-defined transactions, wherein the dependency factor is one of an attribute, a resource, and feature shared by the transaction and the other transaction, and wherein the dependency factor is one of a thread, a TCP port, and a virtual memory address; and dynamically adjust a length of the dependency list based on availability in the memory.

19. The computer device of claim 14, wherein the instructions further configure the computer device to:

in response to there being multiple dependency factors between the transaction and the dependency-defined transactions, create a dependency tree that enumerates the transaction dependency of the transaction, wherein a dependency factor is one of an attribute, a resource, and feature shared by the transaction and another transaction from among the dependency-defined transactions, wherein the dependency factor is one of a thread, a TCP port, and a virtual memory address, and wherein the dependency list is the dependency tree.

20. The computer device of claim 14, wherein highest log filter level is a most detailed log level from among the log filter level of the transaction and the log filter levels of the dependency-defined transactions.

* * * * *